(12) United States Patent
Tanimoto

(10) Patent No.: US 7,956,325 B2
(45) Date of Patent: Jun. 7, 2011

(54) IMAGING APPARATUS AND IMAGE SIGNAL PROCESSING DEVICE

(75) Inventor: Takishi Tanimoto, Gifu (JP)

(73) Assignees: Sanyo Electronic Co., Ltd., Moriguchi (JP); Sanyo Semiconductor Co., Ltd., Ora-gun (JP)

( * ) Notice: Subject to any disclaimer, the term of this patent is extended or adjusted under 35 U.S.C. 154(b) by 849 days.

(21) Appl. No.: 11/979,615

(22) Filed: Nov. 6, 2007

(65) Prior Publication Data

US 2008/0111894 A1    May 15, 2008

(30) Foreign Application Priority Data

Nov. 10, 2006 (JP) .................................. 2006-305399

(51) Int. Cl.
*H01L 31/00* (2006.01)
*H01L 25/00* (2006.01)
*G01J 5/02* (2006.01)

(52) U.S. Cl. ...................... 250/332; 250/330; 250/334

(58) Field of Classification Search ...... 250/330–339.05
See application file for complete search history.

(56) References Cited

U.S. PATENT DOCUMENTS

| | | | |
|---|---|---|---|
| 4,679,068 A * | 7/1987 | Lillquist et al. ................. 348/33 |
| 4,967,276 A * | 10/1990 | Murakami et al. ............ 348/164 |
| 5,881,176 A * | 3/1999 | Keith et al. .................... 382/248 |
| 6,211,521 B1 * | 4/2001 | Bawolek et al. ......... 250/339.02 |
| 6,825,470 B1 * | 11/2004 | Bawolek et al. ......... 250/339.05 |
| 7,274,393 B2 * | 9/2007 | Acharya ........................ 348/273 |
| 7,538,309 B2 * | 5/2009 | Tanimoto et al. .......... 250/208.1 |
| 2006/0186322 A1 | 8/2006 | Matsuyama |
| 2006/0249679 A1 * | 11/2006 | Johnson et al. ................ 250/332 |
| 2006/0268110 A1 * | 11/2006 | Koike et al. .................... 348/159 |
| 2008/0251694 A1 * | 10/2008 | Tanimoto et al. .......... 250/208.1 |

FOREIGN PATENT DOCUMENTS

| | | |
|---|---|---|
| JP | A 10-325798 | 12/1998 |
| JP | A 2006-237737 | 9/2006 |

* cited by examiner

*Primary Examiner* — David P Porta
*Assistant Examiner* — Casey Bryant
(74) *Attorney, Agent, or Firm* — Oliff & Berridge, PLC

(57) ABSTRACT

Infrared light emitted by a fluorescent material is weak. When an infrared image obtained by this fluorescent material is superposed and displayed on a visible-light image, the infrared image is made clear. A signal <IR> of an IR pixel having selective sensitivity to infrared light is subtracted from RGB pixel signals <R>, <B>, and <G> of a solid-state image sensor by adders (20), and signals $R_0$, $G_0$, and $B_0$ that correspond to the R, G, and B components of incident light within <R>, <G>, and <B> are separated and extracted. <IR> is multiplied by each of the gains $\kappa_R$, $\kappa_G$, and $\kappa_B$ to enhance the IR component by multipliers (22), and each is synthesized with $R_0$, $G_0$, and $B_0$ by adders (24). $\kappa_R$, $\kappa_G$, and $\kappa_B$ are set so that the infrared image displayed on the visible-light image by the synthesized IR component is enhanced and displayed in a hue that can be distinguished from the color white or another visible-light image.

13 Claims, 3 Drawing Sheets

IMAGING APPARATUS AND IMAGE SIGNAL PROCESSING DEVICE

CROSS-REFERENCE TO RELATED APPLICATION

The priority application number JP2006-305399 upon which this patent application is based is hereby incorporated by the reference.

BACKGROUND OF THE INVENTION

1. Field of the Invention

The present invention relates to an imaging apparatus for photographing an infrared composite image that is a combination of a visible-light image and an infrared image, and an image signal processing device for generating an image signal that displays the infrared composite image.

2. Description of the Related Art

Fluorescent materials are used in a technique for detecting the structure of a physical object that cannot be clearly perceived in a visible-light image, or detecting the presence of a specific substance in a physical object. For example, in a microscope disclosed in JP-A 10-325798, an antibody combined with the fluorescent material indocyanine green (below referred to as ICG) is used as a probe, and the presence of microcarcinoma in a biological tissue section is detected by observing the fluorescence emitted by the probe that has the property of tending to accumulate in cancerous tissue.

ICG is a pigment that absorbs near-infrared light of about 800 nm and emits approximately near-infrared fluorescent light of about 840 nm. The pigment can be administered as a contrast agent, and infrared images observed thereby can be used in the diagnosis and treatment of diseases. For example, an image of a blood vessel can be observed by injecting ICG into the blood vessel. ICG can also be used to examine liver function by using the property of ICG to combine with the proteins in the blood and to be selectively taken up by the liver.

In surgical operations it is necessary that doctors be able to visually identify the object region. In such situations, there are cases in which it is convenient to obtain images that make it possible to identify the position of a blood vessel present on below the surface of the object region in addition to the usual images obtained as visible-light images. From this perspective, images (infrared composite images) in which an infrared image obtained through a fluorescent contrast agent is displayed in combination with a visible-light image are desirable.

An imaging apparatus that can create visible-light images and infrared images is necessary to generate an infrared composite image. CCD image sensors and other solid-state image sensors have sensitivity not only to visible light but also to near-infrared light. Therefore, it has been proposed to create infrared composite images by using such solid-state image sensors.

The sensitivity of a solid-state image sensor to infrared light is the source of image degradation for the usual goal of creating visible-light images. For example, a problem of a solid-state image sensor provided with color filters and used to create color images is that correct color representation cannot be achieved with incident light that includes infrared-light components because each light-receiving pixel for detecting light component rays that correspond to RGB and other colors also has sensitivity to infrared light. In order to solve this problem, a configuration has been proposed for a solid-state image sensor wherein components having selective sensitivity to infrared light are mixed in an array of light-receiving pixels, as indicated below in JP-A 2006-237737. The light-receiving pixels having sensitivity to infrared light (infrared light-receiving pixels) in the solid-state image sensor are provided in order to eliminate the effect of infrared light on the light-receiving pixels having sensitivity to visible light (visible light-receiving pixels). In other words, a signal obtained from infrared light-receiving pixels is used as a reference signal for estimating and removing the infrared light component contained in the signal from the visible light-receiving pixels.

Infrared light emitted by a fluorescent material is generally of low intensity. Therefore, a problem is encountered in an application in which such a fluorescent contrast agent is administered and the area to be operated on is photographed; i.e., only a blurred infrared composite image can be obtained using a conventional, general solid-state image sensor composed of visible light-receiving pixels.

SUMMARY OF THE INVENTION

The present invention provides an imaging apparatus and an image signal processing device capable of producing an infrared composite image in which a clear infrared image is synthesized with and displayed on a visible-light image.

The imaging apparatus according to the present invention comprises a solid-state image sensor having a two dimensional array of infrared light-receiving pixels having selective sensitivity to infrared light, and a plurality of types of color light-receiving pixels having sensitivity to the aforementioned infrared light and to visible light of mutually different specific colors; and an image signal processing circuit for generating a processed image signal that displays an infrared composite image in which an infrared image is synthesized with and displayed on a visible-light image on the basis of a raw image signal that is output by the solid-state image sensor and is composed of an infrared pixel signal that corresponds to the infrared light-receiving pixels and a plurality of types of color pixel signals that corresponds to each of the color light-receiving pixels.

In the present invention, the image signal processing circuit generates an infrared component image signal that corresponds to an infrared light component, and a plurality of types of color component image signals that corresponds to visible-light components of the specific colors on the basis of the infrared pixel signal and the color pixel signals. The image signal processing circuit synthesizes, for each of the specific colors, the color component image signal and a signal obtained by multiplying the infrared component image signal by the gain of the specific colors in correspondence to the manner in which the infrared image is enhanced; and carries out an infrared composite process for generating converted color component image signals for the specific colors, and a processed image signal generation process for generating the processed image signal on the basis of the plurality of converted color component image signals.

The image signal processing circuit can also be configured so as to perform an intermediate image generation process for generating an intermediate image signal that corresponds to the visible-light image on the basis of the plurality of types of color component image signals; and a processed image signal generation process for generating the processed image signal by varying the luminance or the hue of each pixel that expresses the intermediate image signal in accordance with the signal level of the infrared component image signal.

DESCRIPTION OF THE PREFERRED EMBODIMENTS

Embodiments of the present invention (referred to hereinbelow as embodiments) are described below on the basis of the drawings.

Figure 1:
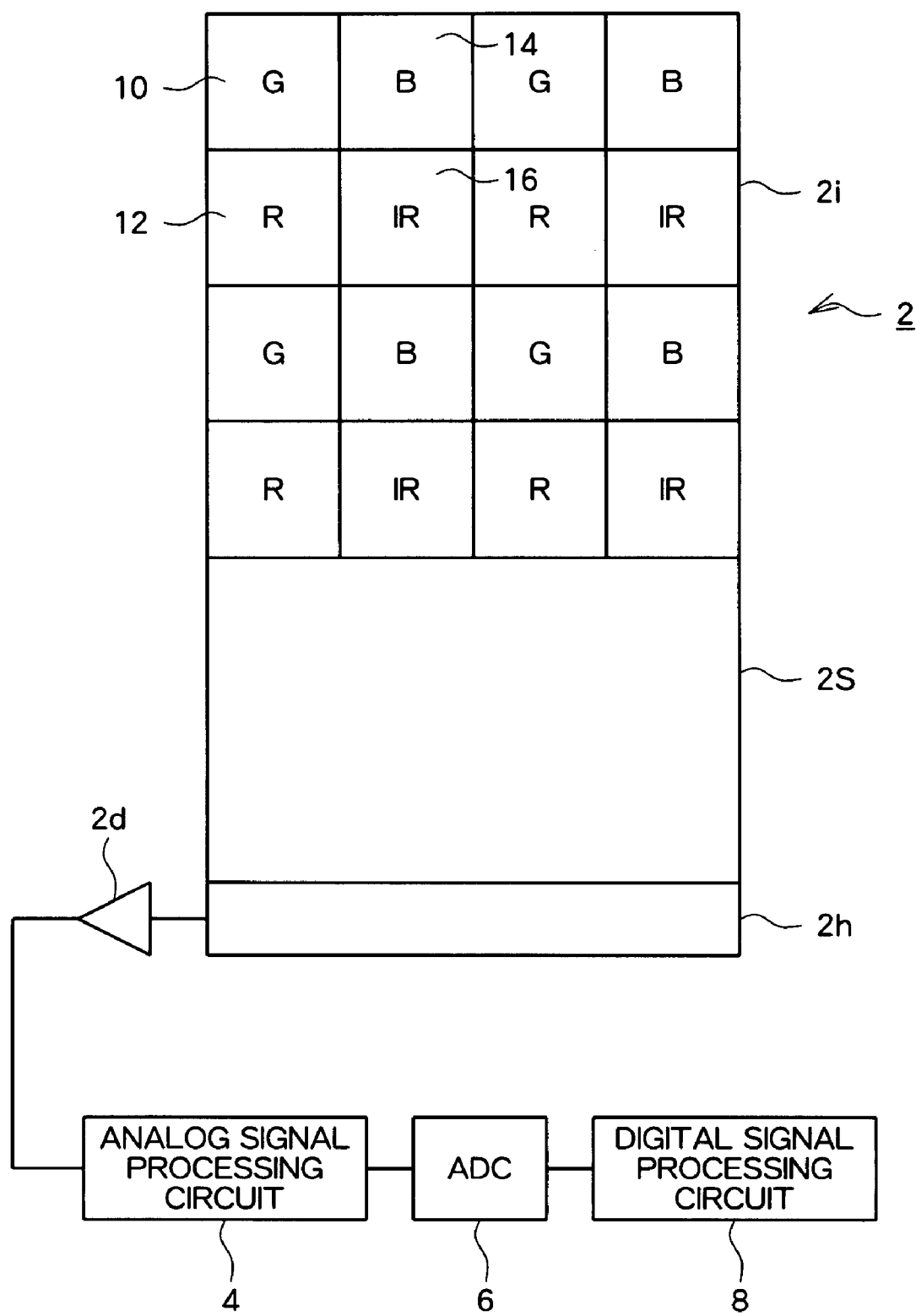
FIG. 1 is a block diagram showing a schematic configuration of an imaging apparatus according to an embodiment of the present invention.

The imaging apparatus of the present embodiment may, for example, be used in patient surgeries and the like, detects infrared light obtained by administering ICG as a fluorescent contrast agent to the patient, and provides an infrared composite image in which an infrared image is synthesized with and displayed on a visible-light image of the surgical region or the like. FIG. 1 is a block diagram showing a schematic configuration of the present imaging apparatus. The imaging apparatus comprises a CCD image sensor 2, an analog signal processing circuit 4, and A/D converter circuit 6, and a digital signal processing circuit 8.

The CCD image sensor 2 shown in FIG. 1 is a frame transfer type and comprises an imaging portion 2*i*, a storage portion 2*s*, a horizontal transfer portion 2*h*, and an output portion 2*d*, which are formed on a semiconductor substrate.

Each of the bits of a vertical register that constitutes the imaging portion 2*i* functions as a light-receiving portion (light-receiving pixels) that constitutes each pixel.

Each of the light-receiving pixels comprises a color filter disposed above a photodiode, and the light components to which the light-receiving pixels have sensitivity are determined in accordance with the transmission characteristics of the filter. In the imaging portion 2*i*, a 2×2 pixel array constitutes a unit of a light-receiving pixel array. For example, light-receiving pixels 10, 12, 14, and 16 constitute such a unit.

Figure 2:
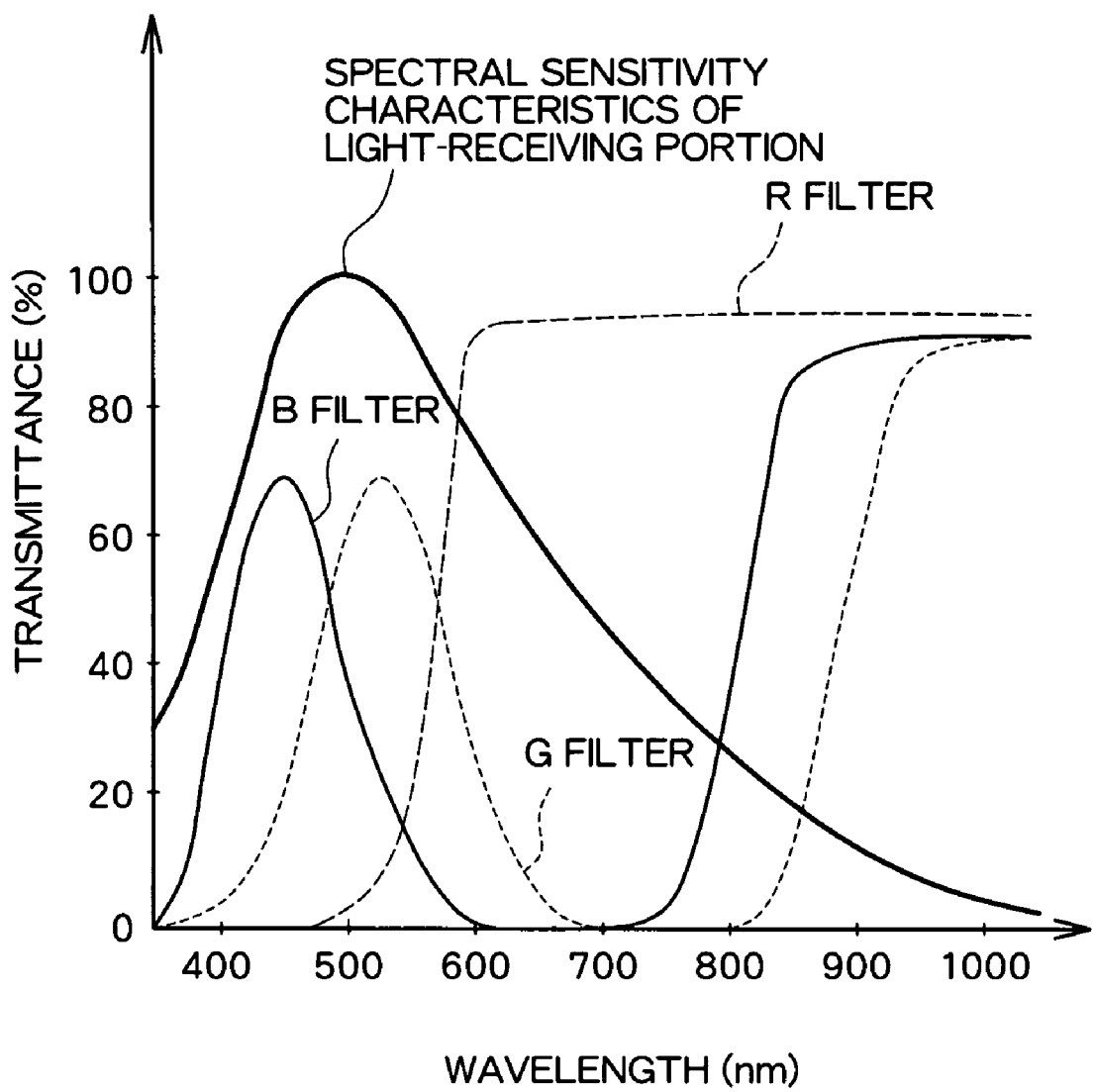
FIG. 2 is a graph showing the transmittance wavelength characteristics of each RGB filter and the spectral sensitivity characteristics of a photodiode.

The color filter is, for example, formed of colored organic materials and is made to transmit the visible light of each corresponding color. Because of its properties, the filter also transmits infrared light. For example, FIG. 2 is a graph showing the wavelength characteristics of the transmittance of the filters R (red), G (green), and B (blue). The drawing also shows the spectral sensitivity characteristics of the photodiode. The transmittance of each color filter shows the intrinsic spectral characteristics in accordance with each color in the visible light region, and shows substantially common spectral characteristics in the infrared light region.

The photodiode possesses sensitivity up to the long-wavelength near-infrared region in addition to the entire visible light region of a wavelength on the order of 380 to 780 nm. Therefore, when an infrared (IR) component is incident on a light receiving pixel, the IR component passes through the color filter and generates a signal charge in the photodiode.

The light-receiving pixel 10 is a green light-receiving pixel provided with a G filter and is a light-receiving pixel for generating a signal charge that corresponds to a G component and an IR component in response to incident light containing not only visible light but also the IR component. In the same manner, the light-receiving pixel 12 is provided with an R filter and is a red light-receiving pixel for generating a signal charge that corresponds to an R component and an IR component. The light-receiving pixel 14 is provided with a B filter and is a blue light-receiving pixel for generating a signal charge that corresponds to a B component and an IR component.

The light receiving pixel 16 is provided with an IR filter (infrared-transmitting filter) for selectively transmitting the IR component and is an IR light-receiving pixel for generating a signal charge that corresponds to the IR component within incident light. This IR filter can be configured by stacking the R filter and the B filter. This is because the B component in the visible light transmitted by the B filter does not pass through the R filter, while the R component transmitted by the R filter does not pass through the B filter. Therefore, passing light through both of the filters substantially removes the visible-light component, but the IR component transmitted by both of the filters still remains in the transmitted light.

In the imaging portion 2*i*, the 2×2 pixel configuration is arrayed repeatedly both in the vertical and in the horizontal directions.

The CCD image sensor 2 is driven by clock pulses supplied from a drive circuit not shown in the diagram. The signal charge generated by the light-receiving pixels of the imaging portion 2*i* is transferred to the output portion 2*d* via the storage portion 2*s* and the horizontal transfer portion 2*h*. The output portion 2*d* converts the signal charge output from the horizontal transfer portion 24 into a voltage signal, and outputs the voltage signal as an image signal.

The analog signal processing circuit 4 carries out amplification, sample and hold, and other processes for the image signal of the analog signal output by the output portion 2*d*. The A/D converter circuit 6 generates and outputs image signal data by converting the image signal output by the analog signal processing circuit 4 into digital data of a predetermined quantization bit rate. For example, the A/D converter circuit 6 performs an A/D conversion to a digital value of 8 bits, whereby the image data is expressed by a value within a range of 0 to 255.

A digital signal processing circuit 8 receives image data from the A/D converter circuit 6 and performs various processes. For example, the digital signal processing circuit 8 filters the R, G, B, and IR data sampled by the R, G, B, and IR light-receiving pixels. The R, G, B, and IR data obtained at mutually different sampling points is interpolated in the filtering process, and the R, G, B and IR data is defined by the interpolation at each of the sampling points that constitute the image. The filtering also includes removal of pixel defects and random noise. Furthermore, the digital signal processing circuit 8 uses these data to perform a process for generating an image signal that expresses an infrared composite image, and generates luminance data (luminance signal) Y, and color difference data (color difference signals) Cr and Cb at each of the sampling points.

Figure 3:
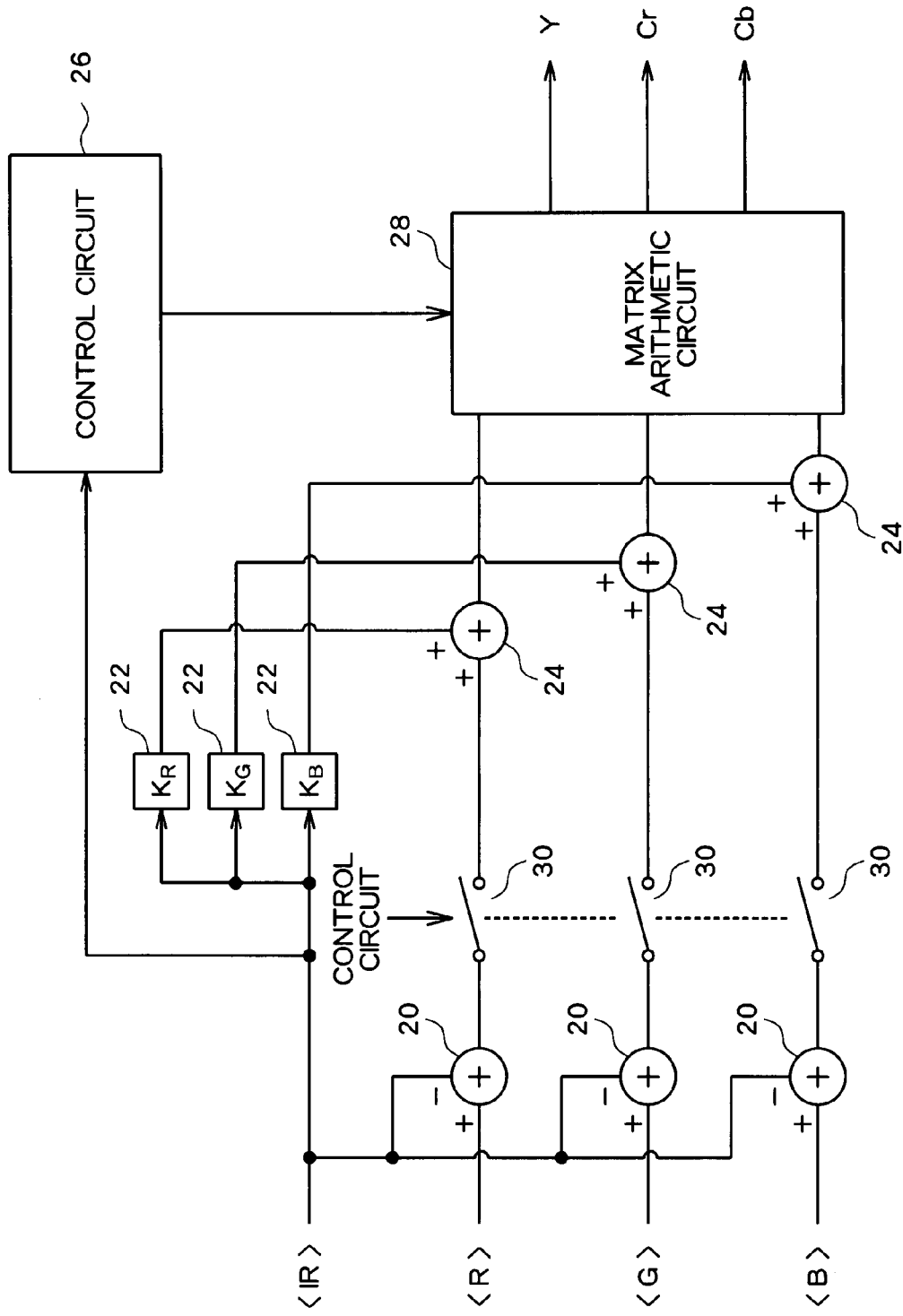
FIG. 3 is a schematic circuit configuration diagram of the image signal processing circuit relating to the generation of a luminance signal Y and color difference signals Cr and Cb in a digital signal processing circuit.

FIG. 3 is a schematic circuit configuration diagram of the image signal processing circuit relating to the generation of the luminance signal Y and color difference signals Cr and Cb in the digital signal processing circuit 8. The functions performed by the digital signal processing circuit 8 can also be carried out by a program executed by a CPU (Central Processing Unit), DSP (Digital Signal Processor), or other devices besides hardware such as the one shown in FIG. 3. The image signal processing circuit generates Y, Cr, an Cb from the signals <R>, <G>, <B>, and <IR> obtained by filtering output signals that correspond to each of the light-receiving pixels R, G, B, and IR. A color signal processing method for generating Y, Cr, and Cb is described below with reference to FIG. 3.

<R>, <G>, and <B> are represented by the following equation. In the equation, $R_0$, $G_0$, and $B_0$ represent signal components of <R>, <G>, and <B> that correspond to the R, G, and B components in the incident light, respectively; and Ir, Ig, and Ib represent signal components of <R>, <G>, and <B> that correspond to infrared light in the incident light, respectively.

$$<R>=R_0+Ir$$

$$<G>=G_0+Ig$$

$$<B>=B_0+Ib \quad (1)$$

A color filter disposed in the light-receiving pixels R, G, B, and IR has substantially the same spectral characteristics in the infrared light region; and the same applies to Ir, Ig, Ib, and <IR>. The following is assumed in order to make a simple description:

$$\text{When } Ir=Ig=Ib=<IR> \quad (2),$$

then the following is obtained from equation (1):

$$R_0=<R>-<IR>$$

$$G_0=<G>-<IR>$$

$$B_0=<B>-<IR> \quad (3)$$

Using this relationship allows the primary color component image signals $R_0$, $G_0$, and $B_0$ to be calculated from <R>, <G>, and <B>, respectively, by using the infrared component image signal <IR>. In the image signal processing circuit of FIG. 3, adders 20 subtract the right-hand side of equation (3) and output $R_0$, $G_0$, and $B_0$. That is, component image signals $R_0$, $G_0$, $B_0$, and <IR> that correspond to each of the RGB components of incident light and the infrared light component are separated and generated on the basis of <R>, <G>, <B>, and <IR>.

The image signal processing circuit comprises a multiplier 22 and an adder 24 for each of the colors RGB. With this configuration, it is possible to perform an infrared composite process in which the infrared component image signal <IR> is multiplied by the gain and is added to and synthesized with each of the color component image signals $R_0$, $G_0$, and $B_0$ obtained by the component image signal generation process. Specifically, the process shown by the following equation is performed in the infrared composite process, and converted color component image signals $R_N$, $G_N$, and $B_N$ are generated.

$$R_N=R_0+\kappa_R<IR>$$

$$G_N=G_0+\kappa_G<IR>$$

$$B_N=B_0+\kappa_B<IR> \quad (4)$$

Here, $\kappa_R$, $\kappa_G$, and $\kappa_B$ are the gains that are set in the multipliers 22 provided in correspondence to RGB. These gains $\kappa_R$, $\kappa_G$, and $\kappa_B$ are determined in accordance with the manner in which the infrared image synthesized over the visible-light image is enhanced. $\kappa_R$, $\kappa_G$, and $\kappa_B$ can be made to be fixed values in accordance with a predetermined enhancement method, but in the present embodiment a control circuit 26 can vary $\kappa_R$, $\kappa_G$, and $\kappa_B$ in accordance with a preset algorithm or with user settings.

For example, an infrared image can be displayed over a visible-light image by varying the luminance of the infrared composite image in accordance with the <IR> at each pixel. In this display aspect, $\kappa_R$, $\kappa_G$, and $\kappa_B$ are set so as to have the same ratio as the R, G, and B component ratio $\alpha:\beta:\gamma$ in white light. In other words, $$\kappa_R:\kappa_G:\kappa_B=\alpha:\beta:\gamma \quad (5)$$

Using the parameter $\theta$, the gains can be expressed as $$\kappa_R=\theta\alpha$$

$$\kappa_G=\theta\beta$$

$$\kappa_B=\theta\gamma \quad (6)$$

$\theta$ can be arbitrarily set in accordance with the degree of enhancement of the infrared image on the visible-light image. For example, $\theta$ can be determined so that the user can easily identify both the visible-image and the infrared image on the composite image. For example, the control circuit 26 can determine the average <IR> level of the entire screen, determine $\theta$ so that an appropriate predetermined balance is realized between the first and second terms on the right side of equation (4) of the entire screen on the basis of the average level, and establish $\kappa_R$, $\kappa_G$, and $\kappa_B$.

The $R_N$, $G_N$, and $B_N$ that are output by the adders 24 are input to a matrix arithmetic circuit 28 and converted to Y, Cr, and Cb. Here, the IR component added to each of the components RGB is made into white light in the RGB synthesis by setting $\kappa_R$, $\kappa_G$, and $\kappa_B$ so as to satisfy equation (5). An infrared image in which the luminance value Y increases according to an increase in the <IR> value in each pixel is thereby displayed in the infrared composite image. The infrared image is enhanced and displayed in accordance with an increase in the $\theta$ setting.

Also, arbitrary colors can be applied to the infrared image on the infrared composite image by manipulating the ratio of the gains $\kappa_R$, $\kappa_G$, and $\kappa_B$. For example, the control circuit 26 sets the ratio of $\kappa_R$, $\kappa_G$, and $\kappa_B$ so as to make the infrared image a hue other than white, and to vary the luminance of the infrared image in accordance with the <IR> at each pixel. The infrared image is enhanced by making the resulting hue setting easily distinguishable from the visible-light image. For example, the visible-light color image of a surgical region has hues essentially in the red range, and the enhanced hue for the infrared image can be set in the blue or green range. This variation of the hue can be configured so as to be performed only for pixels in which <IR> is at a predetermined threshold or higher. Moreover, a configuration can be adopted in which the saturation of the enhanced hue increases in conjunction with <IR> in the case that <IR> increases past the predetermined threshold.

The present image signal processing circuit is configured to be able to stop the input of $R_0$, $G_0$, and $B_0$ to the adder 24. A switch 30 may, for example, be provided to each of the RGB signal pathways as such a stopping means in the configuration shown in FIG. 3. The control circuit 26 turns the switch 30 on and off according to the directions of the user, whereby the display can be switched between an infrared composite image obtained by synthesizing a visible-light image and an infrared image, and an image composed of an infrared image alone.

The method of displaying an infrared image over a visible-light image is not limited to the above-described method of performing addition synthesis that involves color component image signals $R_0$, $G_0$, and $B_0$ as well as a signal in which the infrared component image signal <IR> is multiplied by the gain. For example, an infrared image can be displayed over a visible-light image in a readily discernable manner by a method in which an image signal that corresponds to a visible-light image is generated as an intermediate image signal on the basis of the color component image signals $R_O$, $G_O$, and $B_O$, and the luminance or hue of the pixels in the intermediate image signal is modulated according to the signal level of the infrared component image signal <IR>.

Such an image signal process may, for example, be incorporated into a process in which $R_O$, $G_O$, and $B_O$ are input to the matrix arithmetic circuit 28, and the luminance signal Y and the color difference signals Cr and Cb are generated based upon these inputs. An example of hue manipulation is one in which the control circuit 26 manipulates the conversion coefficient in the matrix arithmetic circuit 28 for each pixel according to the <IR> level of the pixel and sets the ratio of the color difference signals Cr and Cb to be a different value from that in the original visible-light image. The same process can be realized by generating Cr and Cb in the usual manner and then multiplying each by a proportionality coefficient to vary the proportion of the signals.

The process for causing a change in the hue of the visible-light image can be performed only for pixels having <IR> at the predetermined level or above in the same manner as when the infrared image is added and synthesized, or can involve causing saturation to increase together with the increase in <IR>, whereby the infrared image displayed over the visible-light image can be made clearer. A configuration may also be adopted in which the hue as such is varied in conjunction with the increase of <IR> within a range in which the hues of the original visible-light image are able to be distinguished.

By the same principle, an infrared imaged can be displayed in a readily discernable manner over a visible-light image by changing the hue originally possessed by the visible-light image to an achromatic color for pixels in which the <IR> is less than a predetermined threshold, and obtaining an image in the original hue for pixels in which the <IR> is at the predetermined threshold or above.

Luminance may be modulated in place of the hue. For example, an infrared image can be displayed in a readily discernable manner over a visible-light image by reducing the luminance originally possessed by the visible-light image at a constant rate for pixels in which the <IR> does not reach a predetermined threshold, and obtaining an image displayed with the original luminance for pixels in which the <IR> is at the predetermined threshold or above.

Generally, the intensity of infrared light obtained by a fluorescent contrast agent is low. For that reason, an infrared image can be enhanced and displayed over a visible-light image in the present imaging apparatus by such a method. On the other hand, in a state wherein the intensity of infrared light is weak, the infrared component image signal <IR> is readily susceptible to the effects of random noise. In view of this, the abovementioned filtering process performed in the digital signal processing circuit 8 is performed so that the clarity of the infrared image can be increased by increasing the filtering intensity for the infrared component image signal <IR> and removing random noise to reduce the effect of the noise. A temporal process in which noise is suppressed by determining a correlation with the infrared component image signal <IR> between frames can be used as the filtering process in addition to the spatial process performed in the same frame. Also, by adding the infrared component image signal <IR> in multiple frames, an increase in the <IR> level can be achieved in place of the aforementioned method of multiplying by the gain, S/N can also be improved, and the <IR> threshold can readily be set in the aforementioned process.

A frame transfer CCD image sensor 2 is used as the solid-state image sensor in the imaging apparatus of the present embodiment; however, the present invention can also be applied similarly to image signals obtained from another type of solid-state image sensor. For example, the same imaging apparatus as in the abovementioned embodiment can be configured by using an interline transfer or other transfer type CCD image sensor or CMOS image sensor as the solid-state image sensor. The raw image signals <R>, <G>, <B>, and <IR> input to the image signal processing circuit can also be signals output from an image sensor other than a solid-state image sensor.

The imaging apparatus of the aforementioned embodiment has a CCD image sensor 2 as a solid-state image sensor having a two dimensional array of infrared light-receiving pixels having selective sensitivity to infrared light, and a plurality of types of color light-receiving pixels having sensitivity to the aforementioned infrared light and to visible light of mutually different specific colors. A digital signal processing circuit 8 functions as an image signal processing circuit in the imaging apparatus of the present invention, and generates processed image signals Y, Cr, and Cb that display an infrared composite image in which an enhanced infrared image is synthesized with and displayed on a visible-light image on the basis of a raw image signal that is output by the solid-state image sensor and is composed of an infrared pixel signal <IR> that corresponds to the infrared light-receiving pixels, and a plurality of types of color pixel signals <R>, <G>, and <B> that corresponds to each of the color light-receiving pixels.

The image signal processing circuit of an imaging apparatus according to the present invention, and an image signal processing device according to the present invention, carry out a component image signal generation process for generating an infrared component image signal <IR> that corresponds to an infrared light component, and generating a plurality of types of color component image signals $R_O$, $G_O$, and $B_O$ that corresponds to visible-light components of the specific colors on the basis of the infrared pixel signal and the color pixel signals; an infrared composite process for carrying out a process, represented in formula (4), for synthesizing for each of the specific colors the color component image signal as well as a signal obtained by multiplying the infrared component image signal by the gain of the specific colors in accordance with the manner in which the infrared image is enhanced, and generating the converted color component image signals $R_N$, $G_N$, and $B_N$ for each of the specific colors; and a processed image signal generation process for generating the processed image signal on the basis of the plurality of converted color component image signals.

The image signal processing circuit of another imaging apparatus according to the present invention, and another image signal processing device according to the present invention, can also be configured so as to carry out a component image signal generation process for generating an infrared component image signal that corresponds to an infrared light component, and generating a plurality of types of color component image signals that corresponds to visible-light components of the specific colors on the basis of the infrared pixel signal and the color pixel signals; an intermediate image generation process for generating the intermediate image signal that corresponds to the visible-light image on the basis of the plurality of color component image signals; and a processed image signal generation process for generating the processed image signal by varying the luminance or the hue of each pixel that expresses the intermediate image signal in accordance with the signal level of the infrared component image signal.

Each of the processes for providing the functions in the image signal processing device according to the present invention, and in the image signal processing circuit for configuring the imaging apparatus according to the present invention, can also be carried out by hardware circuitry or as software-based arithmetic processes implemented by microprocessors such DSP.

According to the present invention, an image signal that corresponds to an infrared component is obtained independently from an image signal that corresponds to a visible-light component on the basis of an infrared pixel signal that is output by infrared light-receiving pixels, whereby an infrared image can be displayed while being enhanced relative to a visible-light image, and an infrared composite image can be obtained in which a clear infrared image is synthesized with and displayed on a visible-light image.

What is claimed is:

1. An imaging apparatus comprising:
    a solid-state image sensor having, in a two dimensional array, infrared light-receiving pixels having selective sensitivity to infrared light and configured to output an infrared pixel signal, and a plurality of types of color light-receiving pixels having sensitivity to the infrared light and to visible light of mutually different specific colors and configured to output a plurality of types of color pixel signals each of which corresponds to each type of the color light-receiving pixels; and
    an image signal processing circuit configured to generate a processed image signal for displaying an infrared composite image in which an enhanced infrared image is synthesized with and displayed on a visible image on the basis of a raw image signal composed of an infrared pixel signal that corresponds to the infrared light-receiving pixels and a plurality of types of color pixel signals that corresponds to each of the color light-receiving pixels, wherein
    the image signal processing circuit includes:
    a component image signal generator configured to generate an infrared component image signal that corresponds to an infrared light component, and to generate a plurality of types of color component image signals that corresponds to visible-light components of the specific colors on the basis of the infrared pixel signal and the color pixel signals;
    an infrared composite synthesizer configured to synthesize, for each of the specific colors, the color component image signal and a signal obtained by multiplying the infrared component image signal by a gain of the specific color in accordance with the manner in which the infrared image is enhanced, and to generate a converted color component image signal of each of the specific colors; and
    a processed image signal generator configured to generate the processed image signal on the basis of the plurality of converted color component image signals.

2. The image signal processing device according to claim 1, wherein
    the component image signal generator has a first adder for each of the specific colors and is configured to output the infrared pixel signal as the infrared component image signal, the first adder being configured to subtract a signal that is obtained by using the infrared pixel signal and is equivalent to a signal generated by the infrared light incident on the color light-receiving pixel of a specific color corresponding to the first adder from the color pixel signal of the specific color corresponding to the first adder, and being configured to output a color component image signal corresponding to a visible-light component of the specific color; and
    the infrared composite synthesizer has a multiplier and a second adder for each of the specific colors, the multiplier being configured to multiply the infrared component image signal by the gain of a specific color corresponding to the multiplier, and the second adder being configured to add a signal outputting from the multiplier and the color component image signal of the specific color, and to output the converted color component image signal of the specific color.

3. An imaging apparatus comprising:
    a solid-state image sensor having, in a two dimensional array, infrared light-receiving pixels having selective sensitivity to infrared light and configured to output an infrared pixel signal, and a plurality of types of color light-receiving pixels having sensitivity to the infrared light and to visible light of mutually different specific colors and configured to output a plurality of types of color pixel signals each of which corresponds to each type of the color light-receiving pixels; and
    an image signal processing circuit configured to generate a processed image signal for displaying an infrared composite image in which an infrared image is synthesized with and displayed on a visible image on the basis of a raw image signal composed of an infrared pixel signal that corresponds to the infrared light-receiving pixels and a plurality of types of color pixel signals that corresponds to each of the color light-receiving pixels; wherein
    the image signal processing circuit includes:
    a component image signal generator configured to generate an infrared component image signal that corresponds to an infrared light component, and to generate a plurality of types of color component image signals that corresponds to visible-light components of the specific colors on the basis of the infrared pixel signal and the color pixel signals;
    an intermediate image generator configured to generate the intermediate image signal that corresponds to the visible-light image on the basis of the plurality of color component image signals; and
    a processed image signal generator configured to generate the processed image signal by varying luminance or hue of each pixel that expresses the intermediate image signal in accordance with signal level of the infrared component image signal.

4. An image signal processing device configured to generate a processed image signal for displaying an infrared composite image in which an enhanced infrared image is synthesized with and displayed on a visible image on the basis of a raw image signal that is obtained by an image sensor having, in a two dimensional array, infrared light-receiving pixels having selective sensitivity to infrared light and configured to output an infrared pixel signal, and a plurality of types of color light-receiving pixels having sensitivity to the infrared light and to visible light of mutually different specific colors and configured to output a plurality of types of color pixel signals each of which corresponds to each type of the color light-receiving pixels, and that is composed of an infrared pixel signal and a plurality of types of color pixel signals;
    the image signal processing device includes:
    a component image signal generator configured to generate an infrared component image signal that corresponds to an infrared light component, and to generate a plurality of types of color component image signals that corresponds to visible-light components of the specific colors on the basis of the infrared pixel signal and the color pixel signals;

an infrared composite synthesizer configured to synthesize, for each of the specific colors, the color component image signal and a signal obtained by multiplying the infrared component image signal by a gain of the specific color in accordance with the manner in which the infrared image is enhanced, and to generate a converted color component image signal of each of the specific colors; and a processed image signal generator configured to generate the processed image signal on the basis of the plurality of converted color component image signals.

5. The image signal processing device according to claim 4, wherein the gains are set to vary luminance of the infrared composite image in accordance with the infrared component image signal.

6. The image signal processing device according to claim 4, wherein the gains are set to vary hue of each pixel on the infrared composite image in accordance with the signal level of the infrared component image signal.

7. The image signal processing device according to claim 6, wherein, the processed image signal generator is further configured to perform an enhanced hue setting process for setting the hue to a predetermined enhanced hue when the signal level of the infrared component image signal is at a predetermined threshold or above.

8. The image signal processing device according to claim 7, wherein the processed image signal generator increases saturation of the enhanced hue in conjunction with the signal level of the infrared component image signal at or above the threshold.

9. The image signal processing device according to claim 4, wherein the processed image signal generator further includes:

a visible image suppression processor configured to stop the input of the color component image signals into the infrared composite synthesizer; and a composition control processor configured to control the visible image suppression processor and allowing switching to be performed between generation of the processed image signal for displaying the infrared composite image, and generation of the processed image signal for displaying an image composed of the infrared image alone.

10. The image signal processing device according to claim 4, further comprising:

a switching circuit configured to stop the input of the color component image signals into the second adders; and a control circuit configured to turn the switching circuit on and off, whereby an image output from the processed image signal generator is switched between the infrared composite image and an image composed of the infrared image alone.

11. An image signal processing device configured to generate a processed image signal for displaying an infrared composite image in which an infrared image is synthesized with and displayed on a visible image on the basis of a raw image signal that is obtained by an image sensor having, in a two dimensional array, infrared light-receiving pixels having selective sensitivity to infrared light and being configured to output an infrared pixel signal, and a plurality of types of color light-receiving pixels having sensitivity to the infrared light and to visible light of mutually different specific colors and being configured to output a plurality of types of color pixel signals each of which corresponds to each type of the color light-receiving pixels, and that is composed of an infrared pixel signal and a plurality of types of color pixel signals;

the image signal processing device comprising:

a component image signal generator configured to generate an infrared component image signal that corresponds to an infrared light component, and to generate a plurality of types of color component image signals that corresponds to visible-light components of the specific colors on the basis of the infrared pixel signal and the color pixel signals;

an intermediate image generator configured to generate the intermediate image signal that corresponds to the visible-light image on the basis of the plurality of color component image signals; and a processed image signal generator configured to generate the processed image signal by varying luminance or hue of the pixels for displaying the intermediate image signal, in accordance with signal level of the infrared component image signal.

12. The image signal processing device according to claim 11, wherein processed image signal generator further includes an achromatic color setting processor configured to change the hue expressed by the intermediate image signal to an achromatic color for pixels in which the signal level of the infrared component image signal is less than a predetermined threshold.

13. The image signal processing device according to claim 11, wherein the component image signal generator has an adder for each of the specific colors and is configured to output the infrared pixel signal as the infrared component image signal, the adder being configured to subtract a signal that is obtained by using the infrared pixel signal and is equivalent to a signal generated by the infrared light incident on the color light-receiving pixel of a specific color corresponding to the adder from the color pixel signal of the specific color corresponding to the adder, and being configured to output a color component image signal corresponding to a visible-light component of the specific color; and the intermediate image generator has a matrix arithmetic circuit, the matrix arithmetic circuit being configured to perform a matrix calculation for converting a plurality of types of the color component image signals into a luminance signal and color difference signals which correspond to the intermediate image signal in a situation without synthesizing the infrared image;

the processed image signal generator has a control circuit, the control circuit being configured to manipulate conversion coefficients of the matrix calculation for each pixel in the intermediate image signal in accordance with signal level of the infrared pixel signal when the infrared image is synthesized with the visible image, and the matrix arithmetic circuit being configured to generate the processed image of which luminance or hue changed of each pixel is changed from that of the intermediate image.

* * * * *